United States Patent [19]

Williams

[11] Patent Number: 5,512,169
[45] Date of Patent: Apr. 30, 1996

[54] LIQUID COLUMN PACKING MATERIALS

[75] Inventor: Dwight E. Williams, Midland, Mich.

[73] Assignee: Dow Corning Corporation, Midland, Mich.

[21] Appl. No.: 998,466

[22] Filed: Dec. 30, 1992

[51] Int. Cl.$^6$ .......................... B01D 15/08; C07K 17/00; C12N 11/00

[52] U.S. Cl. .................. 210/198.2; 210/656; 435/176; 435/177; 502/403; 530/413; 530/811; 530/812

[58] Field of Search .................. 210/198.2, 656; 502/403; 530/413, 811, 812, 816; 435/176, 177, 181; 436/518, 524, 527, 528, 532

[56] References Cited

U.S. PATENT DOCUMENTS

| | | | |
|---|---|---|---|
| 4,298,500 | 11/1981 | Abbott | 210/198.2 |
| 4,544,485 | 10/1985 | Pinkerton et al. | 210/502.1 |
| 4,675,384 | 6/1987 | Dromard et al. | 530/364 |
| 4,773,994 | 9/1988 | Williams | 210/198.2 |
| 4,778,600 | 10/1988 | Williams | 210/198.2 |
| 4,782,040 | 11/1988 | Revis et al. | 502/401 |
| 4,839,419 | 6/1989 | Kraemer et al. | 210/656 |
| 4,950,634 | 8/1990 | Williams et al. | 502/401 |
| 4,950,635 | 8/1990 | Williams et al. | 502/401 |
| 5,059,654 | 10/1991 | Hou et al. | 530/413 |
| 5,268,306 | 12/1993 | Berger et al. | 435/177 |
| 5,310,885 | 5/1994 | Maier et al. | 530/413 |
| 5,316,784 | 5/1994 | Maurer et al. | 436/532 |

FOREIGN PATENT DOCUMENTS

6258164  3/1987  Japan.

OTHER PUBLICATIONS

Chang et al. "High Speed Ion Exchange Chromatography of Proteins," Analytical Chem., vol. 48, No. 13, Nov. 1976. pp. 1839–1844.

E. Pfannkoch et al, "Characterization of Some Commercial High Performance Size Exclusion Chromatography Columns for Water–Soluble Polymers," J. of Chromatographic Sci., vol. 18, Sep. 1980, pp. 430–441.

J. J. Kirkland "High Speed Liquid–Partition Chromatography with Chemically Bonded Organic Stationary Phases," J. of Chrom. Sci., vol. 9, Apr. 1971, pp. 206–214.

H. Yoshida et al, "Some Characteristics of a Protein–Coated ODS Column and its Use for the Determination of Drugs by the Direct Injection Analysis of Plasma Samples," *Chrom.*, vol. 19 pp.466–472, (1985).

I. H. Hagestam et al, "Internal Surface Reversed–Phase Silica Supports for Liquid Chromatography," Anal. Chem., vol. 57, Jul. 1985 pp. 1757–1763.

R. A. Thompson et al, "Direct Liquid Chromatographic Separation of Enantiomers on Immobilized Protein Stationary Phases," J. of Chrom, 465 (1989) pp. 263–270.

P. S. J. Cheethan, "Principles of Industrial Enzymology," Handbook of Enzyme Technology, publ. J. Wiley (1985) pp. 126–128.

K. P. Hupe, "Fundamental Chromatographic Relationships," High Performance Liquid Chromatography in Biochemistry, publ. VCH 1985 pp. 37–40.

F. R. Bevnatn et al, "Methods of Enzyme Immobilization," Manual of Industrial Microbiology and Biotechnology, publ. Am. Soc. Microbiology, 1986 pp. 244–245.

F. E. Regnier et al, "Glycerolpropylsilane Bonded Phases in the Steric Exclusion Chromatography of Biological Macromolecules" J. of Chrom. Sci., vol. 14, Jul. 1976 pp. 316–320.

*Primary Examiner*—John Kim
*Attorney, Agent, or Firm*—Robert L. McKellar

[57] ABSTRACT

Packing materials for liquid chromatographic or catalytic columns are prepared by contacting a porous protein-adsorptive particulate or membranous support, such as a porous silica particulate support, with an aqueous solution into which a protein has been dissolved to form a saturated coating of protein on the external surfaces of the porous protein-adsorptive support, removing excess protein that remains in solution by washing, and, then crosslinking the protein in the coating. The result is a packing material which resists further adsorption by many different proteins but which continues to provide the adsorptive or catalytic properties of the groups on the internal surfaces of the porous protein-adsorptive support for separations, analysis, or alteration of small molecules. The packing material of the present invention is particularly useful in HPLC or solid phase extraction columns for direct injection drug analysis in plasma, serum, and urine.

19 Claims, No Drawings

LIQUID COLUMN PACKING MATERIALS

BACKGROUND OF THE INVENTION

The present invention relates to packing materials for liquid chrmatographic or catalytic columns, and more particularly it relates to an improved packing material for use in high performance liquid chromatography and to a method for making and using such a packing material.

Liquid column (LC) packing materials are usually porous materials which possess adsorptive or catalytic sites on the pore walls. They may be used as packings in columns or as loose material in vessels. LC packing materials typically are porous particles. However, they may instead be fibers or membranes. Porous membranes also provide filtration. When the pore size of the adsorptive or catalytic membrane excludes large proteins, then ultrafiltration is combined with adsorption or catalysis. Membranes may have small pores throughout their mass which exclude protein. Alternatively, the membrane may be a composite of sintered or adhered porous particles, in which case the pores between particles are large whereas the pores within the sintered or adhered particles are small. For example, Kontes Glass Co. markets a thick porous membrane of polyvinyl chloride upon whose large pore walls are attached small porous silica particles. The pores of the silica particles are much smaller than the pores upon whose walls the silica particles are attached.

Liquid column chromatographic techniques are used for the separation, analysis, and purification of small molecules as well as of polymers such as proteins in solution. Such separations are mediated either by surface interactions or by size or electrostatic exclusion interactions. Surface-mediated separations require a degree of adsorption of solute to the packing surface. The adsorption is usually due to physisorption and can be driven by hydrophobicity for the case of lipophilic solutes (reverse phase or hydrophobic interaction chromatography), by ion exchange for the case of charged solutes, and by bioaffinity interactions. Often several mechanisms occur simultaneously though one usually dominates. The adsorption can also be due to covalent bond formation to the support. For example, dissolved saccharides can form a covalent boronate bond to phenylboronic acid immobilized on a support.

Analysis and purification of biological fluids represents a particularly important application of liquid chromatography. Such biofluids include blood, plasma, serum, urine, tissue extracts and fermentation and cell cultures. Such biological fluids are generally highly aqueous with minimal organic cosolvent content. It is often advantageous to maintain a highly aqueous state since addition of organic cosolvents reduces the solubility of many such proteins, and hence can cause precipitation and loss of some components prior to chromatography. In other instances, precipitation is used to remove interfering substances.

Virtually all proteins are strongly adsorbed by reverse phase packings when the mobile phase in the column is weakly eluting, as is the case with highly aqueous mobile phases. Salting out effects can accentuate such adsorption. All proteins are also adsorbed by ion exchange packings when their charge is counter to that of the ion exchange sites on the packing surface. This condition can be attained by adjusting the mobile phase pH to the appropriate side of the isoelectric point (IEP). Proteins are also known to be adsorbed by unbonded chromatographic silica.

Size exclusion chromatography requires minimal adsorption to the packing surface. Such surfaces are typically very hydrophilic when proteins are subjected to size exclusion chromatography using highly aqueous mobile phases containing little or no organic cosolvent.

Liquid chromatography using a reverse phase packing has been found to be an effective tool in both qualitative and quantitative analysis for drug substances in blood, serum, plasma or urine. Typically the reverse phase packing material is made up of bonded alkyl silica and most typically the packing is a porous silica having octadecylsilane (ODS) bonded to it.

Although the efficiency of such packing materials is good, they have a limited life. While ODS packings absorb the lipophilic drug substances from the sample, they also absorb proteinaceous substances which tend to interfere with fractionation of the drug substance from other materials contained in the sample. This eventually leads to a complete fouling of the chromatographic column. Therefore, it has previously been necessary to carry out a preliminary sample preparation procedure to remove the troublesome proteins.

In the most conventional way, the proteins are precipitated, the aqueous supernatant is extracted with a water-immiscible organic solvent, the organic solvent is removed from the extract by evaporation, and the analyte residue is reconstituted in mobile phase before analysis by high-pressure liquid chromatography. This method is very time-consuming and cost-inefficient.

A second method currently employed involves the adsorption of analytes onto a reverse phase packing of octadecylsilane bonded to silica in a small disposable column. Although this technique can be automated, the columns can be used for only one sample because proteins remain on the packing, and as a result the technique is also cost-inefficient for multiple samples.

In a third method, a reverse phase packing of octadecylsilane bonded to silica is introduced into a precolumn, which is separated from, but connectable to, an analytical column by a switching valve arrangement. Serum samples are injected directly into the precolumn, where the proteins are denatured and accumulated, and the deproteinated analyte solution is passed into the analytical column for fractionation. After approximately three injections, the precolumn must be backflushed to remove the protein residue. This interruptive backflush is time-inefficient for a large number of samples. Furthermore, the octadecylsilane packing eventually deteriorates because proteins cannot be completely removed therefrom.

Accordingly, for reverse phase liquid chromatography it would be desirable to have a packing material which is less protein adsorptive. In my U.S. Pat. Nos. 4,773,994, 4,778,600, 4,782,040, 4,950,634 and 4,950,635 there are disclosed improved reverse phase packing materials, termed dual zone materials. The dual zone reverse phase packing materials display a reduced degree of serum protein adsorption due to a lipophobic fluoroalkyl phase in the external zone. The pore size of the packing material is small so that size exclusion prevents the protein from reaching the internal zone where the lipophilic partitioning phase retains and separates drug substances. Although the lipophobic phase reduces protein adsorption when the mobile phase contains greater than or equal to 20 percent organic cosolvent, further minimization of protein adsorption would be desirable, especially when using more highly aqueous mobile phases in the column.

Other approaches to achieving a packing which has an exterior non-adsorptive to proteins combined with a size-excluded reverse phase interior are known. Size-excluded enzymes have been used to selectively modify the exterior of silica bearing covalently bonded oligopeptides. See, e.g., I. H. Hagestam et al, "Internal Surface Reverse Phase Silica ...", J Chrom. 351, (1986) p. 239. However, the scope of choices for the internal partitioning phase is severally constrained since many desirable partitioning phases may not be easily embodied in an oligopeptide while still remaining cleavable by an enzyme.

An approach that eliminates most constraints on the internal partitioning phase is to coat the packing with sufficient protein to prevent further protein adsorption. When large amounts of serum albumin or plasma are loaded onto an ODS-silica column, the column adsorbs no further protein and is said to be saturated. The silica is selected to have a pore size that excludes the protein from the pores so that the internal reverse phase remains unfouled and separatively active towards small lipophilic solutes such as drugs in plasma. However, the coating is removed by strongly eluting mobile phases. Hence the column saturation is lost during periodic column cleanup or during gradient elution chromatography.

Most of the coating can be permanently attached by passing 100% methanol through the column to denature and physically crosslink the coating. However, some saturation is lost after applying this crosslinking method, so that the entire treatment must be performed several times. After several cycles of saturation followed by denaturation, a permanently saturated column results. Such columns have been used to directly inject plasma and serum samples for LC analysis of drugs. See, e.g., H. Yoshida et al, "Some Characteristics of a Protein-Coated ODS Column ...", Chromatographia, Vol 19, 1985, pp 466–472.

These columns also have significant disadvantages. The Height Equivalent Theoretical Plate height rises more than 75 micrometers after this treatment. Even for the relatively inefficient 26 micrometer ODS-silica used, the plate height rise caused an efficiency loss of over 70%. Smaller silica particles would display much greater efficiency loss if the same plate height rise occurred, as expected if the rise was due to the diffusional barrier of the coating. However, the cause of this relatively low efficiency has not been proven in the literature.

Simple calculus shows that the volume fraction due to the shell of coating relative to the entire coated packing is given by $6 t/D$, where t is the coating thickness and D is the silica particle diameter in micrometers. Hence, the coating thickness is given by $W*D/(600\alpha)$, where W is the protein weight percent and $\alpha$ is the ratio of the coating volumetric density to that of the support.

Although not deemed in the literature to be very high, the amount of protein in the saturated solvent-stable column of Yoshida was found to be very high when compared to the support particle diameter. The product of weight percent times diameter was 2.5×26=65. Given that the bulk densities of protein and of porous silica are about equal, the data could suggest that a thick coating formed on the order of 1100 angstrom thick. Since a single albumin molecule is approximately an 80 angstrom diameter sphere, a multilayer coating may have resulted. Thick coatings are known to degrade efficiency by creating a large barrier to solute diffusion. See, e.g., Kirkland, J., "High Speed Liquid-Partition Chromatography With Chemically Bonded Organic Stationary Phase", *Journal of Chromatographic Science*, Vol. 9 (1971) pp. 206–214. Thus it appears that there is a need to obtain a permanently saturated but thin protein coating on supports.

A second approach to imparting a crosslinked protein coating onto packing materials employs simultaneous contact of glutaraldehyde with a concentrated solution of protein in an unbonded silica slurry in water. Such coated supports have high immobilized protein context and are useful for chromatography of dissolved protein. The object of this approach is to maximize the amount of immobilized protein short of creating an impermeable composite through which liquid could not readily flow. In this approach, the weak adsorption properties of the immobilized protein in the packing material are useful. See, e.g., M. Tsuboi et al, "Chromatography Carrier", Japanese Patent Application No. 198,334/85, Sep. 7, 1985. A similar method uses a two-stage glutaraldehyde crosslinking procedure in which the crosslinking was interrupted after a period of time by washing away serum albumin that had not yet deposited on the silica. Subsequently, more glutaraldehyde was added to ensure that the remaining albumin was tightly crosslinked and permanently attached to the silica. The two stage process ensured that large clumps of support particles were not glued together. Such clumps disrupt flow through the column and degrade efficiency. See, e.g., R. A. Thompson et al, "... Sorbents Obtained by Entrapment of Crosslinked Bovine Serum Albumin in Silica", *Journal Chromatography*, Vol. 465 (1989) pp. 263–270.

The two-stage crosslinking approach resulted in chiral packing materials useful for separating racemic mixtures. However, the efficiency for the isomers of benzoin was only 10,000 plates/meter (P/M). The expected efficiency for the 7 micrometer silica used is 30,000–40,000 P/M. The protein weight percent was 13% and 21% for silica whose pore diameters were 50 and 100 angstroms, respectively. The value of $W*D$ of 119 could suggest that a very thick coating formed, which is consistent with the degraded column efficiency. Hence this approach is not favorable to attaining a saturated but efficient coated packing material.

Yet another approach to forming a protein coating is to use glutaraldehyde as a coupling agent in a first step by bonding it to an aminopropyl-silica, leaving an immobilized aldehyde residue to which in a second step protein can be bonded through the amino side chain of lysine amino acid residues. Often sodium cyanoborohydride or pyridine borane is used to stabilize the bond to the packing by reducing the intermediate imine to the secondary amine. It is common in a final step to block residual immobilized aldehyde by addition of an excess of some hydrophilic primary amine such as tris(hydroxymethyl)aminomethane, glycine, or ethanolamine to avoid non-specific bonding by aldehyde during affinity chromatography. See, e.g., F. R. Bernath et al, "Methods of Enzyme Immobilization", in Manual of Industrial Microbiology and Biotechnology, ed. A. L. Deman & N. A. Solomon, publ. Amer. Soc. Microbiology, Wash. D.C. (1986) pp. 244–5. This approach immobilizes protein by forming covalent bonds between it and the support. Although this approach yields usable products, the partitioning phase is limited in scope since it must also bear amino groups.

Column packing materials bearing biocatalytic residues are also subject to fouling by the sample or process fluid. Such fouling can be due to particulates or to large proteins and colloids in the process fluid. Fouling by particulates physically blocks the column or membrane. However, such fouling can be countered by backflushing. In contrast, fouling by proteins is difficult to reverse, particularly when the protein adsorbs to the packing exterior and obstructs the mouths of the pores. Consequently, obstruction of diffusion of solute to the catalytic interior reduces the activity. See, e.g., P. S. J. Cheetham, "Principles of Industrial Enzymology", *Handbook of Enzyme Technology*, ed. A. Wiseman, publ. J. Wiley (N.Y., 1985) pp 126–128. Reduction of protein adsorption to the packing material would alleviate problems due to this source of fouling.

Thus, despite all of the recent advances in HPLC packing materials, the need still exists for improved minimization of protein adsorption while possessing an internal adsorptive or catalytic phase so as to improve utility and extend the usefulness of such packing materials.

SUMMARY OF THE INVENTION

The present invention meets that need by providing a packing material for liquid chromatographic or catalytic columns which is resistant to protein adsorption. The packing material of the present invention is a porous protein-adsorptive support having a coating of crosslinked protein on the external surfaces thereof. "Crosslinked" refers to bonds formed between protein molecules, although bonds solely within a given protein molecule may be formed concomitantly. Surprisingly, it has been found that by applying a relatively thin but saturated coating of physisorbed protein and crosslinking in situ without displacing part of the coating, the resultant packing material has a valuable combination of two properties: permanently improved resistance to further protein adsorption yet minimal thickness and hence minimal adverse effects that thick coatings generate. Essentially it would appear that by controlling the degree of "protein fouling" in this manner further fouling is minimized and the usefulness of the packing material extended.

Reverse phase, cation exchange, and anion exchange organic resin or silica-based supports are sufficiently protein-absorptive to be used, as is untreated silica. The preferred porous protein-adsorptive support is a porous silica support such as porous silica having a pore diameter of 30 to 300 Å, and a particle size of 1 to 500 micrometers; although, any protein-adsorptive support may be used. When a porous silica support is used it may be one already having an alkylsilane bonded to the surfaces thereof or it may be a dual zone or mixed phase material such as that shown in my U.S. Pat. Nos. 4,773,994, 4,778,600, 4,782,040, 4,950,634 and 4,950,635. In all instances, the coating of crosslinked protein covers the external surfaces of the porous silica support overcoating the alkyl or ketal-blocked-diol or fluoroalkyl or other external phase of the dual zone or mixed phase material.

The protein should be of a sufficient molecular size as to be size-excluded from the internal surfaces of the porous protein-adsorptive support. Larger proteins may be made from smaller ones prior to adsorption to the support. Such larger proteins will be size-excluded from a larger pore-diameter support. Such solution phase crosslinking to make a larger protein is well known in the field of biochemistry. Preferably the protein is one having a molecular size of 40 to 400 Å. In this manner the extent of coating of protein on the porous support is limited to the external surfaces. Preferably, the protein is a water soluble one selected from the group consisting of serum albumin, bovine serum albumin (BSA), egg conalbumin, ovalbumin, and serum α-glycoprotein.

The process of applying the protein should be one that coats an amount of protein to the support which is self-regulated by saturative adsorption to be the minimal effective amount needed to prevent further protein adsorption. Preferably the coating of crosslinked protein is applied to the porous protein-adsorptive support at least in three steps, including these: first, the porous support is contacted with an aqueous solution (into which the protein has been dissolved) for a sufficient period of time to form, and under conditions which form, a saturated coating of physisorbed protein on the external surfaces of the porous support. Second, the excess protein still in solution is washed away. Then, as a third step, all of the protein is crosslinked in situ to form a coating of crosslinked protein on the external surfaces of the porous support. Any conventional crosslinking reaction may be used, including those which use heat, or oxidizing agents or chemical crosslinking agents. The use of chemical crosslinking agents is preferred. Most preferred is the use of crosslinking agents selected from the group consisting of glutaraldehyde, formaldehyde, N, N' dimethylaminopropyl ethyl-carbodiimide, and bis (sulfosuccinimidyl) suberate.

Preferred preparation of the coating when the support is a membrane is by immersion in a stirred liquid so that the support may be subjected to a series of operations by sequentially changing the liquid: Be wetted by solvent or solvents be coated by deposition of protein, be washed to remove excess protein in solution, and be brought into contact with crosslinking agents.

The amount of protein coating needed to saturate a particulate protein-adsorptive support depends on the particle diameter of the support and is independent of pore diameter if the protein is large enough, i.e., of the size indicated above. Generally, a coating of solvent-stable protein between 2.0/D and 10.0/D weight percent of the packing material whose particle diameter is D micrometers may be used. Preferred is preparation of the coating where the support is confined in a tube so that the support may be subjected to a sequence of operations: Be wetted by solvent or solvents, receive protein deposition, be washed to remove excess protein in solution, and be brought into contact with crosslinking agents by simply displacing each liquid that coresides with the support in the tube by the next liquid. Most preferred is preparation of a coating where the particulate support is coated in a slurry whose liquid composition is changed in a sequence of steps to carry out the above operations. A preliminary priming step may be used for coatings made using the slurry approach when the support is hydrophobic, and thus not dispersible in an aqueous solvent containing no surfactant or organic cosolvent.

In the preferred method, porous silica having pore diameters of 30 to 300 Å and particle size of 1 to 500 micrometers in a column or in a slurry containing at least 1 weight percent of support per weight of liquid is contacted with an aqueous solution containing at least 10/D parts of protein to 100 parts of support by weight where D is the support particle diameter in micrometers, and having a pH within 0.5 of the IEP of the protein at 4° C. to 70° C. for a period of 5 minutes to 24 hours with vigorous contact of liquid with support. These deposition conditions represent those in which the maximum amount of protein adsorption would occur in actual use. The above-mentioned preferred proteins will under these conditions form a saturated coating. The protein coating is then washed to remove excess protein still in solution. During the third stage of the process, the coating is crosslinked with conventional crosslinking agents such as those mentioned above under conditions which will not displace the physisorbed protein coating. In the preferred embodiment, those conditions are use of glutaraldehyde at a temperature of 4° C. to 70° C. for a time of 30 minutes to 24 hours.

The resultant packing material has a solvent-stable coating on the external surfaces that resists further adsorption by many different proteins, while continuing to provide the adsorptive or catalytic properties of the groups on the internal surfaces for separation, analysis, or alteration to small molecules. Surprisingly, the packing materials of the present invention perform better as HPLC packings in the sense that the coating of crosslinked protein had less adverse impact on the chromatography and had equal or better resistance to further protein adsorption than previously known protein-resistant packing materials.

Thus the packing materials of the present invention are particularly useful in a method of analysis by liquid chromatography in which an analyte containing biological fluid to be analyzed is contacted with a liquid chromatography column containing the packing material as the present invention. For example, it has been found that bovine serum albumin crosslinked onto reverse phase HPLC columns using the method of the present invention gave greatly improved gradient HPLC of drugs in directly injected serum samples. Packings for use in HPLC isocratic, gradient, column-switching, and SPE columns or as loose batch adsorbents for pharmaceutical analyses and purifications can also be prepared by the method of the present invention.

Accordingly, it is an object of the present invention to provide a packing material having improved liquid chromatography characteristics, to provide a method for making such packing materials. Other objects and advantages of the invention will become apparent from the following detailed description of the appended claims.

DETAILED DESCRIPTION OF THE PREFERRED EMBODIMENT

The porous support for the packing materials of the present invention may be any porous solid which is mildly hydrophobic and/or protein absorptive, including ion exchange packings and even some bioaffinity packings. However, preferred is a porous protein-adsorptive support having hydroxyl groups on its surface such as porous metalloid oxides, porous metallic oxides, and porous mixed metallic oxides. Such materials include silica, silica gel, alumina, stannia, titania, zirconia, and the like. However, HPLC packings are almost always silica particles or silica gels and therefore porous silica is the most preferred. Accordingly, the porous protein-adsorptive support will hereinafter be referred to as a porous silica support. Preferably the pore diameter is 30 to 300 angstroms and most preferably around 60 angstroms. Preferably the particle size is 1 to 500 micrometers and most preferably is 3 to 60 micro-meters.

Prior to treatment in accordance with the present invention the porous silica support may undergo a silylation process with, for example, an octadecylsilane as is well known. Alternatively, the porous silica support may be converted into a dual zone or mixed phase material as is taught in my U.S. Pat. Nos. 4,773,994, 4,778,600, 4,782,040, 4,950,634 and 4,950,635, the disclosures of which are hereby incorporated by reference. In all instances, the coating of crosslinked protein covers the external surfaces of the porous silica support overcoating the alkyl or ketal-blocked-diol or fluoroalkyl or other external phase of the dual zone or mixed phase material.

A preliminary priming step is preferred for coatings made using the slurry approach when the support is hydrophobic, and thus not dispersible in an aqueous solvent containing no surfactant or organic cosolvent. During the priming step, a subsaturative amount of protein is deposited on the support while the support is suspended in a mixture of water and sufficient organic cosolvent to wet and disperse the support prior to its exposure to protein. A sufficient amount of water-miscible organic cosolvent such as methanol, ethanol, propanol, acetonitrile, tetrahydrofuran (THF), acetone etc. is used ranging between 30 and 70 volume percent, depending on the degree of hydrophobicity of the support and on the particular cosolvent. Most preferably, the aqueous portion of the mixed solvent is buffered water whose pH is far from the protein's IEP to enhance protein solubility in the solvent mixture. The amount of protein added should dissolve in the solvent mixture. Preferably the protein may be added to the slurry as a predissolved, concentrated solution in water or buffered water or solvent mixture. Optionally, the pH of the protein-containing slurry may then be gradually adjusted to reduce protein solubility and thus increase the efficiency of utilization of the protein by increasing the fraction which is deposited onto the support. Solubility is near a minimum when the pH of the solvent mixture is equal to that obtained when the initial pH of the buffered water is near the IEP of the protein, as is well known. See, for example, R. Scopes, *Protein Purification*, Springer-Verlag, N.Y. (1986) pp. 52–60. Under the above constraints, protein will not precipitate as separate particles which would be difficult to remove from the support particles.

In any event, as a first actual treatment step in the present method, either an untreated porous silica support or a prior-treated porous silica support, is contacted with an aqueous solution into which a protein has been dissolved. As mentioned, the protein is selected relative to the pore diameter of the porous silica so as to be size-excluded from the internal surfaces of the porous silica. Thus, it preferably has a molecular size of 40 to 400 Å. It should also be water soluble. The preferred proteins are serum albumin, bovine serum albumin (BSA), egg conalbumin, ovalbumin, and serum α-glycoprotein.

The amount of protein coating needed to saturate a protein-adsorptive support depends on the particle diameter of the support and is independent of pore diameter if the protein is large enough. A well known result from calculus is that the fractional volume in a thin outer shell is given by $6t/D$, where $t$ is the shell thickness and $D$ is the particle diameter absent shell. The $t/D$ dependence also holds for non-spherical particles, in which case average values for $t$ and $D$ apply. The amount of protein in a saturated coating may be determined by experiment. In the preferred method of the instant invention, application of dissolved BSA equal to 5 weight percent of the silica provides a sufficient excess of BSA to saturatively coat silica of 4.5 micrometer particle diameter and 60 angstrom pore size, although somewhat lower amounts of BSA also work. Preferred are saturated coatings deposited from aqueous solutions buffered near the IEP. Coatings deposited far from the IEP adsorb additional BSA when the pH nears the IEP. In contrast, coatings formed near the IEP remain resistant to further protein adsorption both at and away from the IEP.

Preferred is preparation of the coating where the support is confined in a tube so that support may be wetted by solvent or solvents, receive protein deposition, be washed to remove protein in solution, and be brought into contact with crosslinking agents by simply displacing each liquid that coresides with the support in the tube by the next liquid. Such liquids may be passed slowly through the tube once and discarded, or they may be recycled through the tube to provide the proper exposure time with more efficient use of the liquid and its protein or reagents.

Most preferred is preparation of the coating where these procedural steps are performed in a stirred slurry of support particles in liquid. Exposure of support to the next step can take place by resuspension of support following solids recovery by filtration, sedimentation, or centrifugation, or sometimes by simply adding a component to the slurry.

Thus, it is the object of the first treatment step of the present invention to produce a thin but saturated physisorbed coating of protein on the external surfaces of the porous silica support. The above-mentioned proteins will form a saturated coating at least under vigorously contacted conditions for exposure times typical of those encountered in use. In any event, after the saturated coating has been applied, it is then washed. Once that has been accomplished, then, as a third step the protein is crosslinked.

Any conventional crosslinking reaction/agent may be used, including those which use heat, or oxidizing agents, or chemical crosslinking agents, but the latter are preferred. For examples, of the latter, see S. S. Wong, *Chemistry of Protein Conjugation and Cross-Linking*, CRC Press, N.Y. (1991). Often crosslinking procedures involve themselves several steps. At least the first portion of the crosslinking reaction should be conducted in a media and at reactant concentrations that do not displace the adsorbed protein into solution prior to the coating being rendered permanently insoluble by sufficient crosslinking. It is well known that the adsorption of water soluble proteins to packing materials with some reverse phase character is maximized at both minimum and maximum organic cosolvent content in the mobile phase. See e.g., K. P. Hupe, "Fundamental Chromatographic Relationships", *High Performance Liquid Chromatography in Biochemistry*, ed. A. Henschen et al, Publ. VCH (Deerfield Beach, Fla. 1985) pp 37–39. Such proteins are generally also very insoluble in solvents not miscible with water. Thus preferred reaction media are air, nonpolar solvents like hexane, water-miscible solvents like acetonitrile, and aqueous media of low organic cosolvent and low organic crosslinking agent content (generally below 10 weight percent total organic). The solvent selected should also provide at least some solubility for the chosen crosslinking agent. The most preferred media are aqueous ones whose pH is near the isoelectric point (IEP) of the particular protein. The most preferred crosslinking agents are selected from the group consisting of glutaraldehyde, formaldehyde, N, N' dimethylaminopropyl ethyl-carbodiimide, and bis (sulfosuccinimidyl) suberate. Some crosslinking reactions are more effective but virtually all of those as described above may be used to provide a permanent coating with some degree of resistance to further protein adsorption as compared to the uncoated support.

As mentioned, during the third treatment step the object is to crosslink the protein in situ under conditions which will not displace the physisorbed coating of protein and will form a solvent-stable coating of crosslinked protein on the external surfaces of the porous silica support. That coating of crosslinked protein is a relatively thin but saturated one. It has been found to resist further adsorption of protein while having a minimal adverse impact on the chromatographic function of the packing material.

The packing materials of the present invention include those which possess a saturated coating of solvent-stable protein comprising about 1 weight percent of a 4.5 micrometer diameter, 60 angstrom pore size reverse phase silica. More generally, they include packing materials which possess a saturated coating of solvent-stable protein comprising less than or equal to 10/D weight percent of a support whose particle diameter is D micrometers. Most generally, they include packing materials which possess a coating of solvent-stable protein comprising between 2.0/D and 10.0/D weight percent of the support. The maximum of 10/D relates to the maximum thickness of the coating. The minimum of 2/D relates to the minimum thickness of coating which still provides a high degree of saturation and resistance to further protein adsorption.

Such coatings are so thin that surface selective analytical methods such as Electron Spectroscopy for Chemical Analysis (ESCA) can detect the underlying support. Such methods can detect an attenuated signal for the coating vs. unattenuated signal for bulk protein, again demonstrating a thin coating. Such methods typically do not detect anything which is more than 200 angstroms below the top surface.

The packing materials of the present invention include those for which the signal by at least one surface selective analytical method of at least one element or chemical group due to the saturated solvent-stable protein coating does not exceed 67 percent of the value for the bulk protein. Similarly, the value due to the solvent-stable protein coating lies between 17 and 67 percent of the value for the bulk protein. The maximum of 67 percent relates to the maximum thickness of the coating. The minimum of 17 percent relates to the minimum thickness of a coating that still provides a high degree of saturation and resistance to further protein adsorption.

The packing materials of the present invention include those for which the signal by at least one surface selective analytical method of at least one element or group due to the support under the saturated solvent-stable protein coating is at least 45 percent of the value for the uncoated support. Similarly, the value due to the support underlying the solvent-stable protein coating lies between 45 and 85 percent of the value for the uncoated support. The minimum of 45 percent relates to the maximum thickness of coating. The maximum of 85 percent relates to the minimum thickness of coating that still provides a high degree of saturation and resistance to further protein adsorption.

The packing material of the present invention is particularly suited for use in reverse phase liquid chromatography and size-exclusion chromatography; although, it may be used for any number of HPLC purposes, for column-switching, in SPE columns or as loose batch adsorbents for pharmaceutical analysis and purification. The preferred packing material, having a porous silica support with a coating of crosslinked protein on the external surfaces thereof, is particularly useful in HPLC columns for direct serum injection drug analysis.

Accordingly, the preferred method of use is to prepare an analyte containing a biological fluid, such as blood serum, to be analyzed and, then, contacting said analyte with a liquid chromatography column packed with the preferred packing material. It has been found, for example, that bovine serum albumin crosslinked onto reverse phase HPLC columns gave greatly improved gradient HPLC of drugs in directly injected serum samples.

The method of use of the preferred embodiment, as well as the method of making the preferred packing materials, is more fully illustrated by the following examples:

EXAMPLE 1

METHOD OF MAKING THE PACKING MATERIAL

A porous spherical silica of 4.5 micrometers particle diameter and 60 angstrom pore diameter purchased from YMC, Inc. was treated as per U.S. Pat. No. 4,959,340 to impart a ketal blocked diol residue to the surfaces. The structure of the silane used for the treatment was

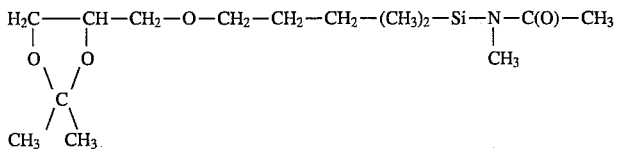

45 grams of the treated silica was coated with crosslinked BSA in the following procedure in which all slurries were made as 10 parts by grams of silica to 100 parts by milliliters of liquid. All steps were conducted at room temperature. BSA was fatty-acid-free grade catalog No. A7030 from Sigma Chemical.

The treated silica was primed in the following way so it could be readily dispersed in water or buffered water: The treated silica was suspended in a 40/60 volume/volume mixture of water buffered to pH 6.8 with 0.02M (potassium) phosphate and denatured alcohol, consisting of 90% ethanol, 5% methanol, and 5% isopropanol by weight. Upon addition of the denatured alcohol, the pH of the mixture rose to 8.3 and was unchanged after dispersal of the silica. To this stirred slurry was slowly added a 1.7 weight % BSA solution in water buffered to pH 6.8 with 0.02 M (potassium) phosphate in the amount of 0.25 parts of BSA to 100 parts of treated silica by weight. Then the pH of the stirred slurry was adjusted to pH 6.3 by slow addition of 0.01M $H_3PO_4$. (Earlier it was found that when water buffered to pH 4.8 with 0.02M (potassium) phosphate was mixed with denatured alcohol in the same 40/60 volume ratio, that the pH of the mixture rose to 6.3.) Then alcohol was removed from the silica with washing by recovering solids using three successive centrifugations and resuspensions in water buffered to pH 4.8 with 0.02M (sodium) acetate.

The above primed silica was resuspended in water buffered to pH 4.8 with 0.02M (sodium) acetate. A saturated coating of BSA was then applied as follows: To the silica slurry was added 5 parts of BSA to 100 parts of silica by weight. The BSA was added as a 7 weight % aqueous solution that had been adjusted to a pH of 4.8 with phosphoric acid. The slurry was stirred for 3 hours to allow a saturated coating to form the silica.

The excess BSA still in solution was removed by the following procedure: The silica was washed by recovery of solids by 4 successive centrifugations and resuspensions in water buffered to pH 4.8 as before.

The saturated coating of BSA was crosslinked by the three-step procedure which used three successive additions of reagent solutions to a slurry of the saturated coated silica in water buffered to pH 4.8 with 0.02M (sodium) acetate. This slurry began as 20 parts by grams of coated silica to 100 parts of buffered water by milliliters. The first reagent solution addition reduced the slurry concentration to approximately 10 parts by grams of silica to 100 parts by milliliters of liquid. The concentration of glutaraldehyde in the first reagent solution was made to be low in order to minimize exposure of the uncrosslinked coated silica to transient high concentrations of organic compound in water.

The first reagent solution termed "crosslinker," was a mixture of 8 parts by weight of a stock solution of 25 weight % glutaraldehyde to 92 parts by weight of water buffered to pH 4.8 with 0.02M (sodium) acetate. The 25 weight % glutaraldehyde stock solution was electron-microscopy-fixative grade, catalog No. G5882 from Sigma Chemical.

The second reagent solution, termed "converter", was prepared by adding 12 parts by volume of a stock solution of 5M sodium cyanoborohydride in water to 84 parts of water by volume. Then the pH is adjusted to 5±0.3 by slow addition of glacial acetic acid with stirring. The stock solution of 5M sodium cyanoborohydride also contained 1M sodium hydroxide and was purchased from Aldrich Chemical, catalog No. 29694-5. The third reagent solution, termed "quencher" was prepared by dissolving 30 parts of tris (hydroxymetheyl)-aminomethane in 35 parts of stock solution of 5M sodium cyanoborohydride, and stirring while slowly adding glacial acetic acid until the pH is 5.5±0.5.

The crosslinking was done as follows: To the initial slurry of coated silica was added enough of the "crosslinker" solution to bring the glutaraldehyde concentration to about 1 weight %. Thus, the slurry was stirred for 3 hours. This step created crosslinks between protein molecules via imide bonds.

To this slurry was added 1 part of "converter" solution to 5 parts of slurry by volume. Then the slurry was stirred for 3 hours. This step drove the crosslinking to completion by reducing the imide bonds to amine.

To this slurry was added 1 part of "quencher" solution to 5 parts of slurry by volume. Stir for 3 hours. This step reduced residual aldehyde to hydrophilic amine.

Excess reactants and soluble by-products were removed with washing by recovery of solids via three successive centrifugations followed by resuspensions, in water. The recovered, washer silica bearing a crosslinked, saturated BSA coating was dried at 100° C. under vacuum overnight.

EXAMPLE 2

CHARACTERIZATION OF THE PACKING MATERIAL OF EXAMPLE 1

The packing material of example 1 contained 0.2 weight % nitrogen after correction for the blank value of 0.07 weight % for the uncoated treated silica. Since dry BSA contains 16.5 weight % nitrogen, the amount of BSA in the packing material was 1.2 weight %. This value lies between the minimum limit of 2.0/D=0.44 and the maximum limit of 10/D=2.2 of the instant invention.

The packing material and the standards were also analyzed by ESCA expressed as the normalized atomic composition of nitrogen, silicon, carbon, and oxygen. These are the principle ESCA—detectable elements present in the BSA and in the uncoated support. The packing material was found to contain 3.9 atomic % of nitrogen and 14.4 atomic % silicon at the surface. The treated silica before coating showed a trace (0.2%) of nitrogen and 19.0 atomic % silicon. A thick piece of dry BSA showed 13.5 atomic % nitrogen and a trace (1%) of silicon due to surface contamination.

The support (treated silica) contributed the attenuated silicon signal and the coating contributed the attenuated nitrogen signal in the ESCA of the packing material. The ratio of the atomic % silicon of the packing material to that of the uncoated treated silica was 0.76. This ratio is between the minimum and maximum limits of 0.45 and 0.85 of the instant invention. The ratio of atomic % nitrogen of the packing material to that of a thick piece of dry BSA was 0.29. This ratio is also between the minimum and maximum limits of the corresponding ratio of 0.17 and 0.67 of the instant invention.

A standard test for protein adsorption was performed as follows: The packing material was dry-packed into a 4.6 mm×10 mm liquid chromatography column. The column was prepared for testing by sequentially passing several milliliters of acetonitrile, water, and water buffered at pH 4.8 with 0.02M (sodium) acetate through it. Into this last mobile phase flowing at 2 mL/min was injected 1 microliter of a 7 weight % solution of BSA dissolved in water buffered to pH 6.8 with 0.02M (potassium) phosphate. The amount of protein eluting in the unretained peak at 0.3 minutes was determined by integration using a UV detector at 220 nanometers. This amount was compared to the amount detected with the column replaced by a union so that no adsorption of BSA by packing material was possible.

The packed column was found to pass 95 percent of the injected BSA without adsorption. This value is in contrast to a similar measurement using the uncoated treated silica. In that case, all of the BSA is adsorbed by the packing material.

EXAMPLE 3

ALTERNATIVE METHOD OF MAKING THE PACKING MATERIAL

A porous spherical silica of 4.5 micrometers particle diameter and 60 angstrom pore diameter purchased from YMC, Inc. was treated as per U.S. Pat. No. 4,941,974 to make a dual zone material. The exterior surfaces bore residues of the structure:

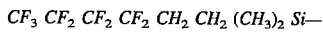

$CF_3\ CF_2\ CF_2\ CF_2\ CH_2\ CH_2\ (CH_3)_2\ Si-$ and the interior bore two residues of the structures:
Structure 2 was identical to that of example 1.
Structure 3 was $C_{18}\ H_{37}\ (CH_3)_2\ Si-$.

The silanes used to impart the first two residues employed the N-methyl-acetamidyl leaving group and the silane used to impart the third residue employed the methoxy residue.

A saturated coating of crosslinked BSA was imparted to 10 grams of the treated silica in the same procedure as was used in example 1.

EXAMPLE 4

CHARACTERIZATION OF THE PACKING MATERIAL OF EXAMPLE 3

The packing material of example 3 was found to contain 0.17 weight % nitrogen by bulk elemental analysis after correction for the blank value of 0.09 weight % found for the uncoated treated silica. Since dry BSA contains 16.5 weight % nitrogen the amount of BSA in the packing material was 1.0 weight % This value lies between the minimum limit of 2.0/D=0.44 and the maximum limit of 10/D=2.2 of the instant invention.

The packing material and the standards were also analyzed by ESCA expressed as the normalized atomic composition of nitrogen, silicon, carbon, oxygen, and fluorine. There are the principal ESCA—detectable elements present in the support. The packing material was found to contain 6.3 atomic % nitrogen and 11.2 atomic % silicon at the surface. The treated silica before coating showed no nitrogen and 19.3 atomic % silicon. A thick piece of dry BSA showed 13.5 atomic % nitrogen and a trace of silicon due to surface contaminations.

The support (treated silica) contributed the attenuated silicon signal and the coating contributed the attenuated nitrogen signal in the ESCA of the packing material. The ratio of atomic % of silicon of the packing material to that of the uncoated treated silica was 0.58. This ratio is between the minimum and maximum limits of 0.45 and 0.85 of the instant invention. The ratio of atomic % nitrogen of the packing material to that of a thick piece of dry BSA was 0.47. This ratio is also between the minimum and maximum limits of the corresponding ratio of 0.17 and 0.67 of the instant invention.

The packing material was subjected to the standard test for protein adsorption described in example 2. The packed column was found to pass 91 percent of the BSA at a mobile phase pH of 4.8. When the mobile phase pH was adjusted to 3.0 or 6.8, the column passed 95 percent and 99 percent of the BSA, respectively. These values are in contrast to zero percent passage (i.e., total adsorption) for a similar measurement of the uncoated, treated silica.

EXAMPLE 5

MAKING PACKING MATERIAL VIA KNOWN ART

A second aliquot of the same lot of treated silica as was used in example 3 was coated with crosslinked BSA using known art, rather than the instant invention. The method of Tsuboi was used (see previous reference) in which there is simultaneous contact of glutaraldehyde, silica, and excess protein in solution. A necessary deviation from know art was required due to the hydrophobic nature of the treated silica: The treated silica was first primed as in example 1 so that it could be dispersed in water or buffered water. This deviation is not material to the final BSA content of the packing material.

The procedure was identical to that of example 3 except for the following difference: The excess BSA still in solution after the formatin of the saturated, uncrosslinked coating was not removed by washing prior to the crosslinking steps. The crosslinked, coated packing material was recovered, washed, and dried just as in example 3.

EXAMPLE 6

CHARACTERIZATION OF THE PACKING MATERIAL OF EXAMPLE 5

The packing material of example 5 was found to contain 0.77 weight % nitrogen by bulk elemental analysis after correction for the blank value of 0.09 weight % found for the uncoated treated silica. Since dry BSA contains 16.5 weight % nitrogen, the amount of BSA in the packing material was 4.6 weight %. This value lies above the maximum limit of 10/D=2.2 weight % of the instant invention.

The packing material and the standards (uncoated treated silica and BSA) were also analyzed by ESCA expressed as the normalized atomic composition of nitrogen, silicon, carbon oxygen, and fluorine. These are the principal ESCA—detectable elements present in the BSA and in the support. The packing material was found to contain 12.5 atomic % nitrogen and 2.0 atomic % silicon at the surface. The treated silica before coating showed no nitrogen and 19.3 atomic % silicon. A thick piece of dry BSA showed 13.5 atomic % nitrogen and a trace of silicon due to surface contamination.

The support contributed the attenuated silicon signal and the coating contributed to attenuated nitrogen signal in the ESCA of the packing material. The ratio of atomic % silicon of the packing material to that of the uncoated treated silica was 0.10: This ratio is below the minimum limit of 0.45 of the instant invention. The ratio of atomic % nitrogen of the packing material to that of the thick BSA piece was 0.93. This ratio is above the maximum limit of 0.67 of the instant invention.

The packing material was subjected to the standard test for protein adsorption described in example 2. The packed column was found to pass only 82 percent of the injected BSA at a mobile phase pH of 4.8 despite having four times the BSA content as that of the packing material of the instant invention made in example 3.

EXAMPLE 7

ALTERNATIVE METHOD OF MAKING PACKING MATERIAL VIA KNOWN ART

Another aliquot of the same lot of treated silica as was used in examples 3 and 5 was coated with crosslinked BSA using known art, rather than the instant invention.

The method used was identical to that of example 5 except that the amount of BSA used during the simultaneous contact of glutaraldehyde, silica and BSA was 20 weight percent of silica.

EXAMPLE 8

CHARACTERIZATION OF THE PACKING MATERIAL OF EXAMPLE 7

The packing material of example 7 was found to contain 3.8 weight percent nitrogen by bulk elemental analysis after correction for the blank value of 0.09 weight percent found for the uncoated treated silica. Since dry BSA contains 16.5 weight % nitrogen, the amount of BSA in the packing material was 23 weight percent. This value lies above the maximum limit of 10/D=2.2 weight percent of the instant invention.

The packing material and the standards were also analyzed by ESCA expressed as the normalized atomic composition of nitrogen, silicon, carbon, oxygen, and fluorine. These are the principal elements detectable by ESCA that are present in the BSA or in the support. The packing material was found to contain 11.4 atomic % nitrogen and 3.8 atomic % silicon at the surface. The treated silica before coating showed no nitrogen and 19.3 atomic % silicon. A thick piece of dry BSA showed 13.5 atomic % nitrogen and a trace of silicon due to surface contamination.

The support contributed the attenuated silicon signal and the coating contributed the attenuated nitrogen signal in the ESCA of the packing material. The ratio of atomic % silicon of the packing material to that of the uncoated treated silica was 0.05: This ratio is below the minimum limit of 0.45 of the instant invention. The ration of atomic % nitrogen of the packing material to that of the thick piece of BSA was 0.84. This ratio is above the maximum limit of 0.67 of the instant invention.

The packing material was subjected to the standard test for protein adsorption described in example 2. The packed column was found to adsorb virtually all of the injected BSA at a mobile phase pH of 4.8, despite having twenty times greater BSA content then that of packing material of the instant invention made in example 3.

EXAMPLE 9

METHOD OF USING THE PACKING MATERIAL OF EXAMPLE 1

The packing material made in example 1 was packed into a 15 cm long by 4.6 mm inner diameter HPLC column, using a conventional slurry packing process. The column was shown to be useful when operated as a conventional HPLC column by separating a mixture of aromatic solvents dissolved in 50/50 volume/volume water/acetonitrile. The mobile phase was also 50/50 water/acetonitrile pumped at 1.0 ml/minute. The solutes were acetophenone, methyl benzoate, toluene, and naphthalene. The respective retention times were 2.6 minutes, 3.1 minutes, 4.3 minutes, and 5.6 minutes. The efficiency of the column was excellent: using the naphthalene peak and the half-width method, the efficiency was measured to be 83,000 plates/meter.

The column was also shown to be useful for drug analysis in blood serum by direct sample injection. The HPLC column maintained efficiency to within 90 percent of its initial value even after injection of 6 mls of calf serum. The mobile phase was 82/18 volume/volume of water buffered to pH 6.8 with 0.02M (potassium) phosphate and acetonitrile. The sample injection volume was 20 microliters, and contained a 50/50 volume/volume mixture of donor calf serum and water buffered as above and containing about 50 microgram/ML each of four drugs. The column passed the serum proteins at the void volume of 1.3 mls eluted, followed by four well separated peaks due to the drugs. The drugs were carbamazepine epoxide, phenobarbital, chlorthalidone, and trichlormethiazide. The respective elution volumes were 6.5, 8.6, 9.8, and 12.6 mls. The initial efficiency measured by the standard half width method on trichlormethiazide was 18,000 plates/meter. A guard column 1 cm long containing the same packing material was changed whenever the efficiency of the system dropped substantially, about once every 150 injections. The final efficiency after 6 mls of calf serum had passed through the column (12 mls of sample) was about 16,500 plates/meter.

EXAMPLE 10

METHOD OF USING THE PACKING MATERIAL OF EXAMPLE 3

The packing material made in example 3 was slurry packed into a 15 cm HPLC column and demonstrated to be useful in separating a mixture of aromatic solutes just as in example 9. The column efficiency for the naphthalene peak was 91,000 plates/meter. Each of the four aromatic solutes, acetophenone, methyl benzoate, toluene, and naphthalene, were well separated from each other. The retention times in 50/50 water/acetonitrile at 1 ml/min were 3.2, 4.1, 6.1 and 7.9 minutes, respectively.

Columns packed with this material also provided good efficiency by reverse phase chromatography of chiral compounds. For example, a mixture of the two chiral isomers of benzoin displayed a single sharp peak with no splitting due to chiral isomer effects. The efficiency was 50,000 plates/meter when using a mobile phase of 30% acetonitrile/70% water at a flow rate of 1 ml/minute.

DISCUSSION OF EXAMPLES

Examples 1 and 3 are respresentative of how to form a saturated coating of crosslinked protein on silica pretreated in two different ways. Each pretreatment provided an external surface adsorptive to protein so that a protein coat could be applied. Examples 2 and 4 demonstrate that their compositions lie within the scope of the instant invention. The level of weight percent BSA in the packing materials is above the 2.0/D minimum that is usually required for saturation and is below the maximum of 10/D that would show undesirably thick, efficiency-degrading coating. The saturated nature of the coating is demonstrated by the low protein adsorption of the packing material: most of the injected BSA appears in the unretained peak. The absence of an unduly thick coating is corroborated by the high efficiency measured in 50% water/50% acetonitrile that is presented in examples 9 and 10. The measured efficiencies are not substantially degraded from those obtained for columns packed with the uncoated treated silica when measured under these same conditions.

Example 10 also shows that there is very little effect of the protein coating on the reverse phase chromatography of chiral mixtures. A single sharp peak is shown for the mixture of the chiral benzoin isomers. In contrast, the existing art of protein coated silica shows a large separation between the benzoin isomers as well as greatly degraded efficiency (i.e., broader peaks) for benzoin.

Examples 5 and 7 are representative of how to form coatings of crosslinked protein on silica by the existing art. Example 7 is more representative because the existing art typically imparts a large amount of immobilized protein to the silica. Less protein was imparted in example 5 in order to show that in that case—where total protein applied was identical to examples 1 and 3 of the instant invention, there was still a significant difference in the amount of protein actually immobilized. Examples 6 and 8 show that compositions made using these existing art procedures are indeed quite different from the instant invention. Their protein content and coating thickness is much greater than compositions of the instant invention, as shown by weight percent protein and by surface analysis for elements characteristic of the protein coating and for those characteristic of the underlying support in the packing materials. Examples of 6 and 8 also show that, despite having much higher BSA content that packing materials of the instant invention as in examples 1 and 3, the protein coating continues to adsorb additional protein, i.e. these packing materials made by existing art procedures do not possess well-saturated coatings.

Having described the invention in detail and by reference to the preferred embodiment thereof, it will be apparent that modifications and variations are possible without departing from the scope of the invention defined in the appended claims.

What is claimed is:

1. A packing material for liquid chromatographic or catalytic columns comprising a porous protein-adsorptive support having a coating of crosslinked protein on the external surfaces thereof, said coating of crosslinked protein being a relatively thin but saturated one, and where the signal obtained by at least one surface selective analytical method for nitrogen due to the saturated crosslinked protein coating does not exceed 67 percent of that for a bulk amount of said crosslinked protein.

2. The packing material of claim 1 where the signal obtained by at least one surface selective analytical method for nitrogen due to the crosslinked protein coating is between 17 and 67 percent of that for a bulk amount of said crosslinked protein.

3. The packing material of claim 1 where the signal obtained by at least one surface selective analytical method for nitrogen due to the porous support underneath the saturated crosslinked protein coating is at least 45 percent of that for an uncoated amount of said porous support.

4. The packing material of claim 3 where the signal obtained by at least one surface selective analytical method for nitrogen due to the porous support underneath the saturated crosslinked protein coating is at between 45 and 85 percent of that for an uncoated amount of said porous support.

5. The packing material of claim 1 wherein said porous protein adsorptive support is particulate and wherein the saturated crosslinked protein coating consists of not more than 10/D weight percent of the material, where D is the support particle diameter in micrometers.

6. The packing material of claim 5 where the crosslinked protein coating consists of between 2.0/D and 10.0/D weight percent of the material, where D is the support particle diameter in micrometers.

7. The packing material of claim 6 wherein said porous protein-adsorptive support is a porous silica support.

8. The packing material of claim 7 wherein said porous silica support has as an internal zone a partitioning phase bonded to the internal surfaces of said porous silica support and has as an external zone a protein-adsorptive phase bonded to the external surfaces of said porous silica support, said coating of crosslinked protein being overcoated onto the external surfaces which already have bonded thereon said partitioning phase.

9. The packing material of claim 7 wherein said porous silica support has a silane residue bonded to the surface thereof, said coating of crosslinked protein being overcoated onto the external surfaces which already have bonded thereon said silane residue.

10. The packing material of claim 1 wherein before said protein is coated onto the support, said protein is a water-soluble one of a sufficient molecular size as to be size-excluded from the internal surfaces of said porous protein-adsorptive support.

11. The packing material of claim 10 wherein before said protein has been coated, it has been slightly crosslinked in solution to raise its molecular size while remaining water soluble.

12. The packing material of claim 10 wherein said protein is selected from the group consisting of serum albumin, bovine serum albumin, egg conalbumin, ovalbumin, and serum α-glycoprotein.

13. The packing material of claim 10 wherein said coating of crosslinked protein is applied to said porous protein-adsorptive support by contacting said porous protein-adsorptive support with an aqueous solution into which said protein has been dissolved for a sufficient period of time to form and under conditions which form a saturated coating of protein on the external surfaces of said porous protein-adsorptive support, removing excess protein that remain in solution, and, then, crosslinking said protein.

14. The packing material of claim 10 wherein after said protein is coated onto the support, said protein is crosslinked with an organic crosslinking agent, or by a oxidizing agent, or by heat.

15. The packing material if claim 14 wherein said protein is crosslinked by a water soluble organic crosslinking agent or by a water soluble oxidizing agent.

16. The packing material of claim 15 wherein said protein is crosslinked with a cross-linking agent selected from the group consisting of glutaraldehyde, N, N' dimethylaminopropyl ethylcarbodiimide, formaldehyde, and bis (sulfosuccinimidyl) suberate.

17. The packing material of claim 16 wherein said protein is crosslinked by glutaraldehyde forming an immobilized imide and an immobilized residual aldehyde, and the immobilized imide is converted to amine with a reducing agent.

18. The packing material of claim 17 wherein the immobilized residual aldehyde is converted to a secondary amine by reaction with a hydrophilic primary amine and a reducing agent.

19. The packing material of claim 18 wherein the reducing agent is cyanoborohydride and the hydrophilic primary amine is selected from the group consisting of tris (hydroxymethyl) aminomethane, glycine, and ethanolamine.

* * * * *